United States Patent
Strandborg et al.

(10) Patent No.: US 12,452,402 B1
(45) Date of Patent: Oct. 21, 2025

(54) DISPLAY DRIVERS, SYSTEMS AND METHODS FOR MULTISCOPY

(71) Applicant: Distance Technologies Oy, Helsinki (FI)

(72) Inventors: Mikko Strandborg, Hangonkylä (FI); Urho Konttori, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/062,670

(22) Filed: Feb. 25, 2025

(51) Int. Cl.
| | | |
|---|---|---|
| *G02F 1/13357* | (2006.01) | |
| *H04N 13/15* | (2018.01) | |
| *H04N 13/167* | (2018.01) | |
| *H04N 13/383* | (2018.01) | |
| *H04N 13/398* | (2018.01) | |

(52) U.S. Cl.
CPC ........... *H04N 13/398* (2018.05); *H04N 13/15* (2018.05); *H04N 13/167* (2018.05); *H04N 13/383* (2018.05)

(58) Field of Classification Search
CPC .... H04N 13/398; H04N 13/15; H04N 13/167; H04N 13/383
See application file for complete search history.

(56) References Cited

U.S. PATENT DOCUMENTS

| | | | |
|---|---|---|---|
| 9,866,813 B2* | 1/2018 | Ward | H04N 13/111 |
| 2014/0285698 A1* | 9/2014 | Geiss | H04N 23/743 |
| | | | 348/333.05 |
| 2016/0173864 A1* | 6/2016 | Yu | H04N 13/383 |
| | | | 348/51 |
| 2017/0177075 A1* | 6/2017 | Zhang | G02B 27/0172 |
| 2022/0045640 A1* | 2/2022 | Kong | H02P 23/18 |

* cited by examiner

*Primary Examiner* — Gims S Philippe
(74) *Attorney, Agent, or Firm* — ZIEGLER IP LAW GROUP, LLC.

(57) ABSTRACT

Information indicative of a relative location of a first eye and a second eye of an individual one of user(s) with respect to a multiscopic optical element is obtained. A first image and a second image are generated or retrieved. For a given multiscopic cell and a given horizontal scanline, first photo-emitting cell(s) and second photo-emitting cell(s) are selected from amongst photo-emitting cells lying on the given horizontal scanline and on whose optical path the given multiscopic cell lies. Then, intensity values for the first photo-emitting cell(s) and the second photo-emitting cell(s) are retrieved. Information indicating the intensity values for the first photo-emitting cell(s) and the second photo-emitting cell(s), and metainformation indicating locations of such photo-emitting cells are included in an input signal being sent to a display driver. Drive signals are generated. Display is driven to present the first image and the second image.

14 Claims, 4 Drawing Sheets

DISPLAY DRIVERS, SYSTEMS AND METHODS FOR MULTISCOPY

TECHNICAL FIELD

The present disclosure relates to systems for multiscopy. Moreover, the present disclosure relates to methods for multiscopy.

BACKGROUND

Three-dimensional (3D) display systems are widely utilised for their ability to create an immersive visual experience without requiring specialised glasses. Among such systems, lenticular arrays are widely employed to produce stereoscopic effects by directing different image to each eye of a user, enabling depth perception. Typically, lenticular array-based displays rely on a series of lenticular lenses aligned with underlying pixels to project distinct views to each eye of the user. However, achieving precise alignment and maintaining stereoscopic effect as a position of the user changes present significant challenges, particularly in terms of pixel mapping, computational demands, and signal processing.

Conventionally, existing technologies addresses the aforesaid challenges using static or semi-static lenticular arrays combined with display driver integrated circuits (DDICs). Typically, a DDIC is a specialised integrated circuit that receives a display signal (via a display port or a mobile industry processor interface (MIPI) interface) as an input and generates necessary driving signals for driving a display, including voltage levels and timing. The DDICs allow for controlling an output colour of each display pixel separately and are often responsible for determining a maximum refresh rate of the display. In many display applications, a DDIC is a limiting factor when determining a maximum refresh rate of the display. Some DDICs also support pixel binning, where groups of pixels (for example, a 2×2 block of pixels) are driven using same input pixel colour to simplify processing. However, such conventional approaches are inherently inefficient in 3D displays due to their inability to fully utilize all available pixels and sub-pixels, resulting in reduced effective resolution and increased computational requirements.

For example, in the case of lenticular arrays, a majority of the sub-pixels are not used as they are either invisible to viewers or visible to multiple viewers. A single lenticular lens may cover 4-10 pixels vertically, but for a single stereo viewer (i.e., for a left eye and a right eye of a viewer), only a narrow band of sub-pixels beneath the lenticular lens are usable for emitting light towards each eye of the viewer. As a result, a horizontal resolution of the display effectively reduces to a number of lenticular lenses covering a surface of the display, while a vertical resolution remains unchanged. This results in horizontally-elongated pixels and an inefficient utilisation of image rendering resources. Moreover, existing approaches often rely on high-bandwidth transmission to deliver image data for all sub-pixels, regardless of their visibility, leading to an inefficient use of graphics processing unit (GPU) resources and an increased power consumption. Additionally, techniques such as vertical binning can partially mitigate resolution loss but often significantly degrade rendering quality.

Therefore, in light of the foregoing discussion, there exists a need to overcome the aforementioned drawbacks.

SUMMARY

The aim of the present disclosure is to provide a system and a method that enable in presenting the first image and the second image to respective eyes of one or more users, in a computationally-efficient, bandwidth-efficient, and time-efficient manner, by way of driving a display using drive signals. The aim of the present disclosure is achieved by a system and a method for multiscopy, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 3A and FIG. 3B illustrate two exemplary vertical lines of pixels in a given image prior to binning and upon binning, respectively, while FIG. 3C illustrates colours of corresponding photo-emitting cells in a display based on said binning, in accordance with an embodiment of the present disclosure;

DETAILED DESCRIPTION OF EMBODIMENTS

Figure 1:
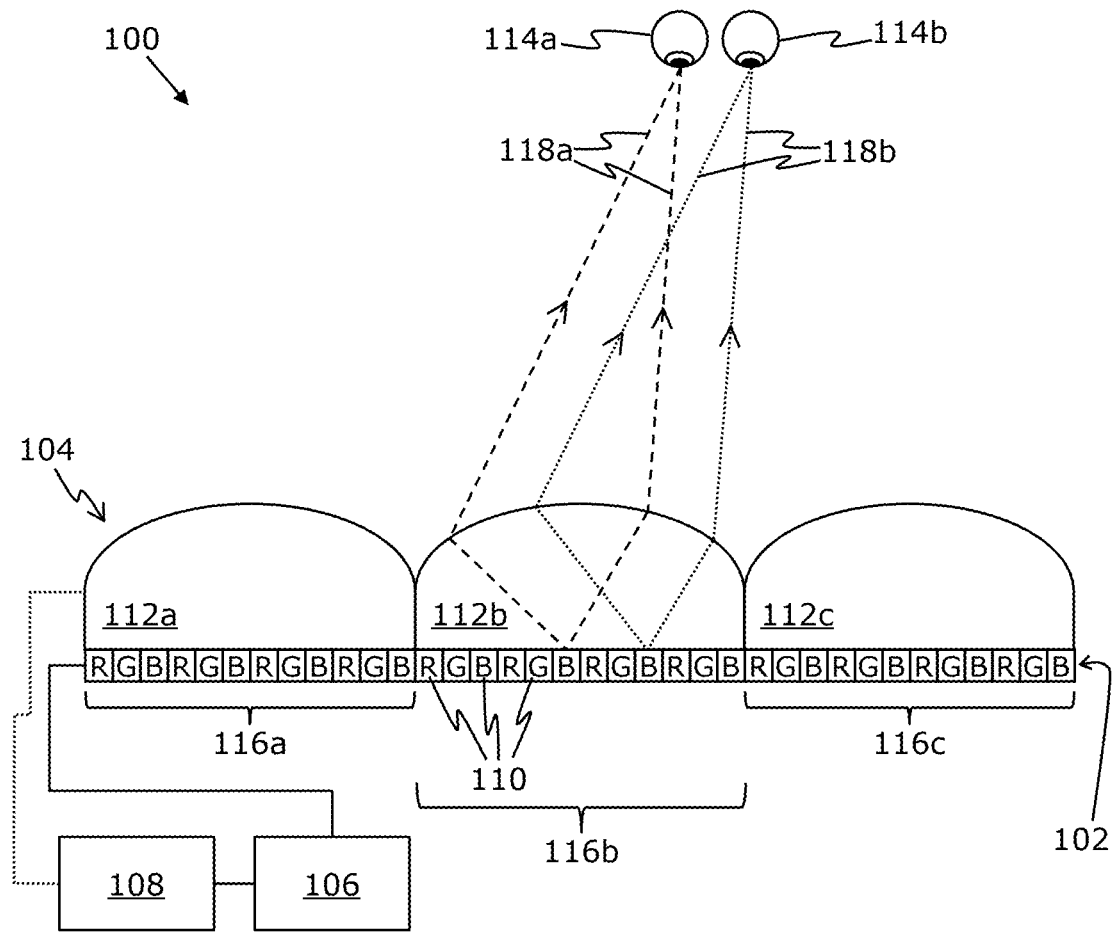
FIG. 1 illustrates an exemplary implementation of a system for multiscopy, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a system comprising:
  a display comprising a plurality of photo-emitting cells;
  a multiscopic optical element arranged on an optical path of the display, the multiscopic optical element comprising a plurality of multiscopic cells;
  a display driver connected to the display; and
  at least one processor configured to:
    obtain information indicative of a relative location of a first eye and of a second eye of an individual one of at least one user with respect to the multiscopic optical element;
    generate or retrieve a first image and a second image, based on the relative location of the first eye and of the second eye of the individual one of the at least one user with respect to the multiscopic optical element, respectively;
    for a given multiscopic cell and a given horizontal scanline, select, from amongst photo-emitting cells lying on the given horizontal scanline and on whose optical path the given multiscopic cell lies, at least one first photo-emitting cell whose emitted light passes through the given multiscopic cell towards the first eye of the individual one of the at least one user, and at least one second photo-emitting cell whose emitted light passes through the given multiscopic cell towards the second eye of the individual one of the at least one user, based on the relative location of the first eye and of the second eye of the individual one of the at least one user with respect to the multiscopic optical element, respectively, and a location of the given multiscopic cell in the multiscopic optical element;

for the given multiscopic cell and the given horizontal scanline, retrieve intensity values for the at least one first photo-emitting cell and intensity values for the at least one second photo-emitting cell, from the first image and the second image, respectively; and for the given multiscopic cell and the given horizontal scanline, include in an input signal being sent to the display driver: information indicating the intensity values for the at least one first photo-emitting cell, information indicating the intensity values for the at least one second photo-emitting cell, and metainformation indicating a location of the at least one first photo-emitting cell and of the at least one second photo-emitting cell in the given horizontal scanline on the display;

wherein the display driver is configured to:

generate drive signals based on the input signal; and drive the display using the drive signals to present the first image and the second image to the first eye and the second eye of the individual one of the at least one user, respectively.

In a second aspect, the present disclosure provides a method comprising:

obtaining information indicative of a relative location of a first eye and of a second eye of an individual one of at least one user with respect to a multiscopic optical element, wherein the multiscopic optical element is arranged on the optical path of a display, the multiscopic optical element comprising a plurality of multiscopic cells, and the display comprising a plurality of photo-emitting cells;

generating or retrieving a first image and a second image, based on the relative location of the first eye and of the second eye of the individual one of the at least one user with respect to the multiscopic optical element, respectively;

for a given multiscopic cell and a given horizontal scanline, selecting, from amongst photo-emitting cells lying on the given horizontal scanline and on whose optical path the given multiscopic cell lies, at least one first photo-emitting cell whose emitted light passes through the given multiscopic cell towards the first eye of the individual one of the at least one user, and at least one second photo-emitting cell whose emitted light passes through the given multiscopic cell towards the second eye of the individual one of the at least one user, based on the relative location of the first eye and of the second eye of the individual one of the at least one user with respect to the multiscopic optical element, respectively, and a location of the given multiscopic cell in the multiscopic optical element;

for the given multiscopic cell and the given horizontal scanline, retrieving intensity values for the at least one first photo-emitting cell and intensity values for the at least one second photo-emitting cell, from the first image and the second image, respectively;

for the given multiscopic cell and the given horizontal scanline, including in an input signal being sent to a display driver: information indicating the intensity values for the at least one first photo-emitting cell, information indicating the intensity values for the at least one second photo-emitting cell, and metainformation indicating a location of the at least one first photo-emitting cell and of the at least one second photo-emitting cell in the given horizontal scanline on the display, wherein the display driver is connected to the display;

generating drive signals based on the input signal; and driving the display using the drive signals to present the first image and the second image to the first eye and the second eye of the individual one of the at least one user, respectively.

The present disclosure provides the aforementioned system and the aforementioned method that enables in presenting the first image and the second image to respective eyes of the individual one of the at least one user, in a computationally-efficient, bandwidth-efficient, and time-efficient manner. Herein, only those photo-emitting cells of the display per multiscopic cell that are actually visible to the first eye and the second eye from a given viewing direction (namely, respective relative locations) are activated by the display driver. This means information pertaining to intensity values for only said photo-emitting cells and locations of only said photo-emitting cells on the display, are included in the input signal. When this input signal is provided to the display driver, drive signals are generated only said photo-emitting cells which actually contribute in presenting the first image and the second image to the first eye and the second eye of the individual one of the at least one user. In other words, only said photo-emitting cells would be driven to emit light towards eyes of the individual one of the at least one user, upon passing through the multiscopic optical element. This is the reason why the at least one first photo-emitting cell and the at least one second photo-emitting cell are selected. In this way, processing resources and memory bandwidth utilised for image generation and transmission is minimal for the at least one processor.

Throughout the present disclosure, the term "display" refers to a device that is capable of presenting images to the at least one user. Examples of the display include, but are not limited to, a liquid crystal display (LCD) and a light-emitting diode (LED) display. The LED display could be an organic-LED (OLED) display, a micro-LED display, or similar. The term "photo-emitting cells" refers to light-emitting elements of the display. It will be appreciated that a given photo-emitting cell is understood to be a sub-pixel that emits light (based on a given intensity value) when electrically activated. Optionally, the plurality of photo-emitting cells are arranged in a structured layout on the display. Such a structured layout could, for example, be a matrix of photo-emitting cells or photo-emitting cells being arranged in a grid pattern. When the display is driven, each photo-emitting cell can be dynamically controlled based on input signals sent by the at least one processor to the display driver. These input signals comprises intensity values for the plurality of photo-emitting cells, the intensity values being derived from separate images corresponding to each eye of the individual one of the at least one user. The term "intensity value" refers to a numerical representation that quantifies at least one of: a colour value, a brightness value, a luminance value level, a transparency value, of a pixel of a given image. The intensity value determines an amount of light emitted, transmitted, or reflected by a given photo-emitting cell in the display. The colour value could be a red-green-blue (RGB) value, a cyan-magenta-yellow (CMY) value, or similar. Correspondingly, photo-emitting cells would also be RGB photo-emitting cells, CMY photo-emitting cells, or similar.

Throughout the present disclosure, the term "multiscopic optical element" refers to a specialised optical element that is capable of directing light incident thereupon in different directions simultaneously. This allows the multiscopic optical element to present a multiscopic view to the individual one of the at least one user without any need for her/him to wear 3D glasses. Optionally, the multiscopic optical element is implemented as any one of: a parallax barrier, a lenticular array. The multiscopic optical element can be static or actively controllable. The multiscopic optical element and its forms are well-known in the art.

The term "multiscopic cell" refers to an individual optical component within the multiscopic optical element that is configured to modulate, refract, or focus light emitted by corresponding photo-emitting cells of the display. Each multiscopic cell operates to direct the light at specific angles to project a view of a given image to a given eye of the individual one of the at least one user, enabling a depth perception when viewing images. Optionally, when the multiscopic optical element is implemented as a lenticular array, the plurality of multiscopic cells are lenticules. Alternatively, optionally, when the multiscopic optical element is implemented as a parallax barrier, the plurality of multiscopic cells are transparent portions.

Throughout the present disclosure, the term "input signal" refers to an electrical signal or a digital data transmitted from the at least one processor to the display driver. Herein, the input signal could be in the form of two image data streams per user namely, one for the first eye and another for the second eye. The metainformation encompasses the location of the at least one photo-emitting cell and of the at least one second photo-emitting cell within the given horizontal scanline. It is necessary for correctly interpreting or rendering the intensity values for selected photo-emitting cells. The metainformation may be included in respective image data streams, or can be sent in a separate stream.

Since only some of the photo-emitting cells lying on the given horizontal scanline would be visible to eyes of the individual one of the at least one user based on relative locations of the eyes with respect to the multiscopic optical element, the at least one first photo-emitting cell and the at least one second photo-emitting cell are selected. This is due to the fact that, typically, in 3D displays utilising multiscopic optical elements, inefficiency arises because a multiscopic optical element divides light emitted from the photo-emitting cells into discrete viewing zones, each viewing zone projecting light in specific directions to create a stereoscopic effect. Thus, only photo-emitting cells corresponding to a viewing direction of eyes of a user are visible, while other photo-emitting cells remain hidden or unused for said user. Furthermore, many viewing zones may also remain unutilised if no users occupy their corresponding viewing directions, leaving corresponding photo-emitting cells effectively invisible. This reduces an effective resolution available to each user, as a total display resolution is distributed across multiple viewing zones, with a majority of the photo-emitting cells not contributing to forming an image that would be visible to a single user.

In order to mitigate the aforesaid issue, based on the relative position of the first eye, the at least one processor selects the at least one first photo-emitting cell on the given horizontal scanline such that the emitted light passes through the given multiscopic cell to reach the first eye. Similarly, based on the relative position of the second eye, the at least one processor selects the at least one second photo-emitting cell on the given horizontal scanline such that the emitted light passes through the given multiscopic cell to reach the second eye. A selection of the at least one first photo-emitting cell and the at least one second photo-emitting cell ensure that the multiscopic optical element presents slightly-different images (i.e., images having an offset) to the eyes of the individual one of the at least one user, creating an illusion of depth. It will be appreciated that the at least one processor dynamically adjusts the aforesaid selection of photo-emitting cells if the at least one user changes position, ensuring that a 3D viewing effect is maintained without visual distortion.

In an example, for a given viewing direction, only a single photo-emitting cell (or, assuming not 100 percent focused multiscopic cell with a small circle-of-confusion, some blend of 2 neighbouring photo-emitting cells) is visible to a given user at a given time. An illusion of colour will be formed by combining a contribution of neighbouring photo-emitting cells (in both a vertical direction and a horizontal direction) together, similarly to red, green, and blue (RGB) sub-pixels in traditional displays. This blending mechanism compensates for a limited visibility of sub-pixels at any given time and ensures that a coherent and accurate colour image is perceived by the individual one of the at least one user. Additionally, the multiscopic optical element may be slightly angled relative to a pixel grid to avoid visual artifacts, such as colour banding or rainbow effects caused by an alignment mismatches.

Pursuant to embodiments of the present disclosure, a selection of the at least one first photo-emitting cell and the at least one second photo-emitting cell ensure that the multiscopic optical element presents slightly-different images (i.e., images having an offset) to the eyes of the individual one of the at least one user, creating an illusion of depth whilst utilising a majority of the photo-emitting cells contributing to image presentation. A synergistic combination of the given multiscopic cell and the given horizontal scanline allows selective activation of photo-emitting cell along the given horizontal scanline, optimizing light path control and reducing angular dispersion. Beneficially, this approach not only enhances image sharpness but also minimizes computational complexity by enabling parallel processing of intensity values for multiple photo-emitting cells.

By generating and transporting images for each viewer at the effective display resolution, the system and the method enable in improving processing resources utilization and reduces memory bandwidth requirements during image generation. This approach minimises unnecessary processing, leading to lower power consumption during image signal transfer to the display driver. Furthermore, the system and the method facilitates in processing fewer pixels, which can either reduce a die area for the display driver or enable higher refresh rates for the display. These benefits collectively contribute to a more efficient and power-conscious operation, making the system and the method susceptible to be employed for applications requiring multiscopic displays with precise image rendering for individual users. The system and the method are fast, robust, easy to implement, and facilitate seamless integration with display technologies of varying resolutions and form factors.

The multiscopic optical element is positioned in line with the optical path of the display in a manner that light emitted by the plurality of photo-emitting cells passes through the plurality of multiscopic cells, which refract, direct, or block specific light rays to ensure that the first eye and the second eye perceive slightly-different image perspectives, thereby simulating a three-dimensional (3D) depth when viewing the images. The multiscopic optical element is configured to spatially and angularly modulate the light to create multiple viewing zones for multiple viewers, wherein each viewing zone corresponds to a distinct angular projection of displayed content (namely, images), such that the light rays intended for the first eye and the second eye are separated by precise angles. This separation ensures that each eye views a different subset of photo-emitting cells, producing a stereoscopic effect without requiring an external viewing devices like 3D glasses.

In an example, the multiscopic optical element may be fully (or nearly-fully) focused to a surface of the display, each viewing direction (in horizontal direction) corresponds to a unique spot on a surface of the display being magnified to fill an entire surface of the multiscopic optical element. This means that for each eye, ideally, only a single photo-emitting cell is visible at a time per each scanline. This is the reason the multiscopic optical element (for example, a lenticular array) is typically arranged at an angle relative to the surface of the display, thereby covering a next scanline of photo-emitting cells that corresponds to a slightly different spot on the surface of the display, and similarly, across several scanlines such that enough photo-emitting cells can be perceived so as to form a full-colour image. If the multiscopic optical element may be straight, the at least one user would only see a single-colour component at each vertical scanline, causing very visible "rainbow" effect. Therefore, theoretically, for two simultaneous stereo users, at least 4 photo-emitting cells would be needed per multiscopic cell, assuming locations of the two simultaneous stereo users the individual one of at least one user to be perfectly aligned so that there are no overlaps. However, in a real-world implementation, a higher number of photo-emitting cells per multiscopic cell is typically necessary. For example, achieving a satisfactory stereoscopic effect for a single (non-static) user may require 12 photo-emitting cells per multiscopic cell. For multiple viewers, a number of required photo-emitting cells per multiscopic cell would likely need to be at least double of 12, to maintain visual quality and stereoscopic accuracy.

Throughout the present disclosure, the term "display driver" refers to an electronic circuit, a module, or an integrated circuit (IC) configured to control and manage an operation of the display by transmitting electrical signals to activate and regulate the plurality of photo-emitting cells. Typically, the display driver is implemented as a semiconductor integrated circuit, but may alternatively comprise a state machine made of discrete logic and other components. The display driver provides an interface between a microprocessor, a microcontroller, an application-specific integrated circuit (ASIC) or general-purpose peripheral interface and a particular type of display device.

The at least one processor controls an overall operation of the system. The at least one processor is communicably coupled to the display driver and optionally, to the multiscopic optical element (in a case where the multiscopic optical element is actively controllable). Optionally, the at least one processor is implemented as a processor of a display. Alternatively, optionally, the at least one processor is implemented as a processor of a computing device that is communicably coupled to the display. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service. It will be appreciated that the at least one processor optionally comprises multiple processors, wherein one of the multiple processors may be implemented as a digital pre-processor block.

In some implementations, the at least one processor is configured to obtain the information indicative of the relative location of the first eye and of the second eye of the individual one of the at least one user, from tracker, wherein the at least one processor is communicably coupled to the tracker. In some cases, the display comprises the tracker. The term "tracker" refers to a specialised equipment for detecting and/or tracking a location of at least a first eye and a second eye of a given user. Optionally, the tracker is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera and the at least one depth camera) may be utilised in the tracker. When different types of images captured by the various different types of tracking cameras are utilised, a location of the given eye of the given user can be determined highly accurately, as results obtained from one type of image can be used to refine results obtained from another type of image. Herein, these different types of images constitute tracking data collected by the tracker, and may be in form of at least one of: visible-light images, IR images, depth images. It will be appreciated that the tracker tracks both eyes of the given user with a significantly high accuracy and precision, such that an error in determining the relative location may, for example, be minimised to within a tolerance range of approximately (+/−) 8 millimetres. In other implementations, the information indicative of the relative location of the first eye and of the second eye of the individual one of the at least one user is pre-known to the at least one processor, for example, in a case when a location of the individual one of the at least one user is fixed.

In some implementations, the first image and the second image are generated by the at least one processor itself, based on the relative location of the first eye and of the second eye of the individual one of the at least one user with respect to the multiscopic optical element, respectively. In other implementations, the first image and the second image are pre-generated and pre-stored at a data repository wherefrom it is retrieved by the at least one processor, the data repository being communicably coupled to the at least one processor. The data repository may be implemented as a memory of the at least one processor, a cloud-based database, or similar.

In some implementations, a given image represents a visual scene of a virtual environment comprising at least one virtual object. Optionally, in this regard, the at least one processor is configured to generate the given image from a perspective of the relative location of the first eye and the second eye of the individual one of the at least one user, by employing a three-dimensional (3D) model of the virtual environment. The term "given image" encompasses the first image and/or the second image. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model" of the virtual environment refers to a data structure that comprises comprehensive information pertaining to the at least one virtual object. Such a comprehensive information is indicative of at least one of: a plurality of features of the at least one virtual object or its portions, a shape and a size of the at least one virtual object or its portions, a pose of the at least one virtual object or its portions, a material of the at least one virtual object or its portions, a colour and an optical depth of the at least one virtual object or its portions. The 3D model may be generated in the form of a 3D polygonal mesh, a 3D point cloud, a 3D surface cloud, a voxel-based model, or similar. Optionally, the at least one processor is configured to store the 3D model at the data repository. It will be appreciated that the relative location of the first eye and of the second eye with respect to the multiscopic optical element indicate a viewing direction of the first eye and a viewing direction of the second eye, respectively. Therefore, the first image and the second image are generated based on these viewing directions. It will also be appreciated that the first image and the second image may be generated in a form of two-dimensional (2D) user interface (UI) elements. The 2D UI elements could pertain to, for example, a virtual navigation tool, a virtual gadget, a virtual message, a virtual entity, a virtual entertainment media, a virtual information, or similar.

The term "scanline" refers to a line of photo-emitting cells in the display. It will be appreciated that each scanline may correspond to a given segment (namely, part) of the given image, and its positioning may play a role in how visual content (in form of emitted light) is directed towards a given eye of the individual one of the at least one user.

It will be appreciated that a use of the multiscopic optical element in combination with the photo-emitting cells lying on the given horizontal scanline enables precise control over light projection towards each eye of the individual one of the at least one user, thereby facilitating presentation of stereoscopic images with 3D depth perception without requiring specialized eyewear. It will also be appreciated that the system facilitates in dynamically adjusting an optical path of light emitted by a given photo-emitting cell, based on relative positions of the eyes of the individual one of the at least one user, thereby allowing for adaptive viewing angles and ensuring a realistic visual experience even as the at least one user changes position within a viewing zone of the display. Furthermore, it will be appreciated that the system supports bandwidth optimisation by leveraging the fact that only a single sub-pixel or a blend of neighbouring sub-pixels is visible at any given moment, thereby reducing the data load required for rendering complex visual scenes.

Optionally, the at least one processor is configured to adjust a shape of the given multiscopic cell of the multiscopic optical element, based on the relative location of the first eye and of the second eye of the individual one of the at least one user with respect to the multiscopic optical element, and the location of the given multiscopic cell in the multiscopic optical element, wherein the at least one first photo-emitting cell and the at least one second photo-emitting cell are selected based further on the shape of the given multiscopic cell.

In this regard, the term "shape" refers to a geometric configuration of the given multiscopic cell within the multiscopic optical element. The shape of the given multiscopic cell defines a physical boundary or a curvature of the given multiscopic cell which determine its ability to direct light towards different viewing positions.

Since the at least one processor knows the relative location of the first eye and the second eye of the individual one of the at least one user, as well as the location of the given multiscopic cell of the multiscopic optical element, the at least one processor would adjust (i.e., modify) the shape of the given multiscopic cell in a manner the emitted light is directed towards the first eye and the second eye. It will be appreciated that the at least one processor adjusts the shape of the given multiscopic cell, by altering a curvature, an orientation, a refractive profile, or similar, of the multiscopic optical element in order to ensure that the emitted light is correctly focused on each eye. This adjustment compensates for variations in user positioning, head tilt, or viewing angles, enabling proper projection of the emitted light through the multiscopic optical element. It is to be understood, for such a functionality, a dynamic multiscopic optical element is preferably used instead of a static multiscopic optical element to adapt to variations in positioning of the individual one of the at least one user, enabling precise light steering for maintaining consistent visual quality, an accurate depth perception, and seamless autostereoscopic viewing without requiring external accessories. This is because the static multiscopic optical element cannot adapt much to variations in the relative positions of the eyes of the individual one of the at least one user or changes in viewing angles. Such a limitation results in fixed viewing zones, leading to misalignment of light rays when the at least one user moves, thereby causing visual artifacts (such as image distortion, loss of stereoscopic effect, and the like). Beneficially, in such a case, the dynamic multiscopic optical element is employed, and when a position of the individual one of the at least one user changes, the at least one processor would modify a shape of at least one multiscopic cell of the dynamic multiscopic optical element, in order to realign focal points and preserve the stereoscopic effect.

Once the shape of the given multiscopic cell is adjusted, the at least one processor selects the at least one first photo-emitting cell (whose emitted light passes through the given multiscopic cell towards the first eye of the individual one of the at least one user) and the at least one second photo-emitting cell (whose emitted light passes through the given multiscopic cell towards the second eye of the individual one of the at least one user) based on the adjusted shape. In this regard, the at least one processor determines which photo-emitting cells correspond to an adjusted projection angle of the given multiscopic cell (due to a shape change). For selection, the at least one processor evaluates a position and an alignment of photo-emitting cells with respect to the adjusted shape. This likely ensures that the light emitted by the at least one first photo-emitting cell is directed accurately towards the first eye, and the light emitted by the at least one second photo-emitting cell is directed accurately towards the second eye. As the shape of the multiscopic cell changes (for example, in response to the user's head position or viewing angle), the display driver modifies its control of the plurality of photo-emitting cells accordingly, so that the light passes through the multiscopic optical element in a manner that aligns with the user's eyes, as discussed later in detail. This dynamic adjustment of the display driver is essential for maintaining the correct stereoscopic effect and ensuring that each eye perceives a highly accurate and legible image. It will be appreciated that adjusting the shape of the given multiscopic cell enhances an accuracy of light projection, ensuring that each eye receives legible visual content regardless of slight changes in head tilt or viewing angle. A technical effect of the aforementioned feature is that the system dynamically adapts an optical geometry of the given multiscopic cell, thereby enabling precise alignment of emitted light to the eyes of the individual one of the at least one user. This results in an improved stereoscopic image quality and greater flexibility to accommodate multiple users and varying viewing angles without requiring physical repositioning of the display.

Since locations of the at least one first photo-emitting cell, the at least one second photo-emitting cell are known to the at least one processor, as well as locations of pixels of the first image and pixels of the second image are also known to the at least one processor, it can be easily determined that which pixel(s) of the first image corresponds to (namely, maps with) the at least one first photo-emitting cell and which pixel(s) of the second image corresponds to the at least one second photo-emitting cell. Accordingly, intensity values of said pixel(s) in the first image are retrieved for the at least one first photo-emitting cell and intensity values of said pixel(s) in the second image are retrieved for the at least one second photo-emitting cell. It is to be understood that the intensity values for the at least one first photo-emitting cell and the intensity values for the at least one second photo-emitting cell are used to lit up (namely, illuminate) the at least one first photo-emitting cell and the at least one second photo-emitting cell, respectively. This ensures that the light emitted by the at least one first photo-emitting cell and the at least one second photo-emitting cell, upon passing through the given multiscopic cell, forms correct stereo views (of the first image and the second image) for the first eye and the second eye of the individual one of the at least one user.

Optionally, prior to retrieving the intensity values, the at least one processor is configured to bin pixels of the first image along an individual one of vertical lines of pixels, and bin pixels of the second image along an individual one of vertical lines of pixels. In this regard, in some implementations, said binning is performed at a sub-pixel level. In such implementations, for a given vertical line of pixels in the first image, sub-pixels of a same colour can be binned together to form a single, super sub-pixel (namely, a binned sub-pixel). Similarly, for a given vertical line of pixels in the second image, sub-pixels having a same colour can be binned together to form a single, super sub-pixel. This specific implementation has been illustrated in conjunction with FIGS. 3A, 3B, and 3C. It will be appreciated that the binning can alternatively be performed when generating or retrieving the first image and the second image. Moreover, the aforesaid binning is performed along individual one of vertical lines of pixels of the given image because it is preferrable to avoid any horizontal binning as the horizontal binning will likely further reduce an effective horizontal resolution of the display. Thus, the at least one processor performs a vertical binning to use a same input signal for multiple scanlines as otherwise the effective horizontal resolution is significantly lower than a vertical resolution of the display, thereby beneficially dropping bandwidth requirements for sending input signals. It will be appreciated that due to the vertical binning, a number of times the step of retrieving needs to be performed can be reduced by a factor of 1/x, wherein x is the number of pixels binned together along a vertical scanline. It will also be appreciated that the vertical binning facilitates data compression, enabling faster processing and minimizing an amount of data transferred or stored, which is especially beneficial for real-time applications. In some implementations, the binning is performed in a tiled manner such that rectangular groups of pixels that are binned together are arranged in a brick or running bond manner. In such a case, the metainformation could include a code indicating how the rectangular groups are arranged. This can be sent just once, because there is no need to change the arrangement across a sequence of images. It will be appreciated that with fewer pixels to process, the display driver benefits from either a smaller die area or the ability to support a higher refresh rate, thereby enhancing an overall performance of the system. A technical effect of the aforementioned feature is that it facilitates in reducing data processing and bandwidth usage, by reducing a number of intensity values that need to be retrieved and processed, whilst maintaining sufficiently-high spatial resolution for multiscopic display architectures to deliver high-quality 3D visual output.

In an example, consider a 5K display with a native resolution of 5120×2880 pixels (i.e., in total approximately 14.75 million pixels). The display driver is capable of updating every pixel at 60 Hertz (Hz), requiring a pixel bandwidth of at least 890 mega pixels per second. In this regard, a multiscopic optical element may be placed on a top of the display, with a lens pitch of 6 pixels per multiscopic cell (corresponding to 18 photo-emitting cells per multiscopic cell, assuming an RGB side-by-side sub-pixel arrangement). An effective horizontal resolution for a single viewing location is 5120/6 equal to 854 pixels. In order to maintain a 1:1 pixel aspect ratio, a vertical binning may also be applied, resulting in an effective vertical resolution of 2880/6 equal to 480 pixels. As a result, for a single stereo viewer, only two streams of 854×480 (i.e., 0.41 mega pixel) images at 60 Hz need to be transmitted over an interface of the display. This reduces processing requirement of the display driver to 49.2 mega pixels per second, which is 5.5 percent of an original pixel bandwidth. While additional simultaneous viewers would add an additional image stream per eye, an overall pixel traffic remains significantly lower than processing un-binned images. Furthermore, if a given image may be generated by the at least one processor, it only needs to generate images at 854×480 resolution, rather than creating a full 5K framebuffer and transmitting it in a frame-by-frame manner. It may be noted that in practice, a size of the vertical binning could also be less than 6 scanlines to improve rendering quality of the given image.

It will be appreciated that the vertical binning can be understood in comparison with conventional 2D displays, wherein such 2D displays can be configured to operate in a half-resolution mode. For example, in conventional 2D displays having a native display resolution of 1024×512 pixels, the display driver could receive frames with 512×256 resolution, wherein each pixel in input data (comprising intensity values for photo-emitting cells) would be replicated to a 2×2 pixel block on the display. In contrast, in the present disclosure, when vertical binning is implemented, the input data would be reduced to, for example, ¼ of a native display resolution of the display, and the display driver would reuse same intensity values for 4 successive scanlines of photo-emitting cells. A given image can be directly generated at such a lower resolution, or alternatively, can be generated by downscaling from a higher resolution version.

Notably, in order to drive the display for presenting the first image and the second image, the intensity values for the at least one first photo-emitting cell and the intensity values for the at least one second photo-emitting cell are required by the display driver to generate the drive signals for the display. Moreover, it is also required where the at least one first photo-emitting cell and the at least one second photo-emitting cell are located on the display. Thus, the aforesaid information and the metainformation are included in the input signal being sent to the display driver.

The display driver utilises said input signal to generate drive signals for driving the display, wherein the drive signals are used to control an intensity of light emitted by the at least one first photo-emitting cell and the at least one second photo-emitting cell. This facilitates creation of stereo views by adjusting the light emitted through the given multiscopic cell, ensuring each eye receives appropriate/legible visual content. It will be appreciated that by sending both the intensity values and the metainformation in the input signal, the display driver can precisely control brightness and direction of the light emitted by the at least one first photo-emitting cell and the at least one second photo-emitting cell. This improves accuracy and quality of 3D visual effects generated by the display. It will also be appreciated that the use of the input signal with all necessary information enables fast data transmission to the display driver, resulting in a reduced latency and enabling real-time updates for high-frame-rate applications (such as virtual-reality applications). Optionally, an intensity value in the input signal is an intensity value of a single sub-pixel that is visible at a given moment. For example, a specific colour component out of three basic colour components: red, green, and blue colour components. It will be appreciated that this approach simplifies generation of the input signal but, in a realistic scenario, it is often beneficial to light up some neighbouring sub-pixels (namely, photo-emitting cells) as well to ensure accurate colour reproduction, compensating for light leakage that can occur between sub-pixels. Hence, while only one-colour component of a pixel is selected per eye per multiscopic cell, neighbouring sub-pixels are typically adjusted to their correct values to achieve the desired effect.

It will be appreciated that the display driver controls a timing, a voltage, and data sequence necessary for activating the plurality of photo-emitting cells. The display driver ensures that the first image and the second image are properly aligned and displayed to the first eye and the second eye of the individual one of the at least one user. The display driver can dynamically adjust signals based on real-time position data of the user's eyes, enabling adaptive rendering and maintaining consistent image quality during movement. A technical effect of employing the display driver in the aforesaid manner is that it facilitates high-speed data transmission and precise signal delivery to the display, enabling low-latency, real-time rendering for an autostereoscopic 3D imaging. The display driver supports scalable resolution and can handle high frame rates, making the system suitable for applications in VR, AR, and immersive environments.

Throughout the present disclosure, the term "drive signal" refers to an electrical signal generated by the display driver that is used to control an operation of the plurality of photo-emitting cells within the display. The drive signal determines specific attributes of the emitted light, such as intensity, colour, and timing, based on the input signal received by the display driver. The drive signal facilitates an activation and modulation of an individual photo-emitting cell (or optionally, groups of photo-emitting cells) to accurately render visual content on the display. Upon receiving the input signal, the display driver processes the information and the metainformation to generate the drive signals for driving the display, i.e., for controlling each photo-emitting cell. The generated drive signals ensure that the plurality of photo-emitting cells emit light at specified intensities and colours, corresponding to the information extracted from the first image and the second image.

Using the generated drive signals, the display driver controls the plurality of photo-emitting cells in the display to present the first image to the first eye and the second image to the second eye of the individual one of the at least one user. The plurality of photo-emitting cells direct light through the plurality of multiscopic cells, such as lenticular lenses or parallax barriers, to create distinct views for each eye. By aligning the emitted light according to the user's eye locations, the display driver ensures that the visual content is projected in a stereoscopic manner, enabling the perception of depth and a 3D effect. The configuration enables multiple users to view individualized stereo content by dynamically adapting the drive signals for each multiscopic cell, thereby providing an immersive visual experience with minimal image distortion. It will be appreciated that a number of photo-emitting cells per multiscopic cell per horizontal scanline depends on a number of eyes being served by the display. For example, each multiscopic cell can direct light to both eyes of a single user, enabling a stereo vision. For N users, each having 2 eyes, a total number of photo-emitting cells required per multiscopic cell per horizontal scanline is 6N photo-emitting cells. When there are 2 stereo users, 12 photo-emitting cells (i.e., 6 photo-emitting cells per user) to address both eyes of each user.

It will be appreciated that the given multiscopic cell is configured to optically magnify a region of the display, wherein said region corresponds to one or two photo-emitting cells of the display. The given multiscopic cell magnifies light emitted by the one or two photo-emitting cells and directs the magnified emitted light across its entire surface along a viewing direction (i.e., towards a given eye of a given user), wherein different viewing directions correspond to different regions of the (underlying) display. The magnified emitted light can be understood to be a light cone emanating from the surface of the given multiscopic cell. Such a direction-dependent selective magnification and directional light distribution enables in generation of stereoscopic visual effects.

Optionally, for at least two consecutive horizontal scanlines, same information indicating intensity values per multiscopic cell is included only once in the input signal. In this regard, consecutive horizontal scanlines can be understood to be sequential (namely, adjacent) rows of photo-emitting cells that are arranged horizontally across the display without any gaps. Thus, it is highly likely that the at least two consecutive horizontal scanlines (on whose optical path a given multiscopic cell lies) are to present same visual information to the individual one of the at least one user, and intensity values for the at least two consecutive horizontal scanlines would be same. In such a case, the same information indicating the intensity values per multiscopic cell is included only once in the input signal. A technical benefit of this is that it facilitates in reducing data redundancy in the input signal i.e., it minimizes an amount of data required for transmission, thereby improving bandwidth efficiency and resulting in a decreased power consumption during the transmission of the input signal. It will be appreciated that, in some implementations, when the at least two consecutive horizontal scanlines correspond to a same multiscopic cell, the system reduces redundancy by including information indicating a complete set of RGB values only once in the input signal. However, when a next scanline corresponds to a different set of photo-emitting cells (such as in a lenticular lens configuration), the system ensures that a complete three-component RGB information per multiscopic cell is sent. This ensures consistent colour rendering and prevents loss of visual quality, especially in scenarios where slight variations in viewing angles or misalignments may necessitate changes in sub-pixel selection.

Optionally, the at least one user is a plurality of users, wherein the at least one processor is configured to activate a two-dimensional (2D) viewing mode in at least a part of the display, by using intensity values per multiscopic cell per horizontal scanline that are retrieved and used for a given user, for a remainder of the plurality of users also. In this regard, the term "two-dimensional viewing mode" refers to a display mode in which the at least one processor presents a 2D, non-stereoscopic image to all users. In such a case, all the users perceive same visual content regardless of their eye locations with respect to the multiscopic optical element. When the 2D viewing mode is activated, same intensity values (that are to be used for the given user) are used for the remainder of the plurality of users also, rather than using different multiple sets of intensity values for them. A technical benefit of this is that 2D virtual content can be presented to the plurality of users in a convenient manner as there would not be any need for displaying different stereo images (representing the at least one virtual object) to a first eye and a second eye of each of the plurality of users (i.e., no stereoscopy is needed when presenting the 2D virtual content to the plurality of users); in other words, a same image could be displayed to the first eye and the second eye of each of the plurality of users. Since the 2D viewing mode does not require depth adjustments in the image, the image is rendered uniformly, allowing the plurality of users to view the same image without complexity of stereoscopic content. It will be appreciated that when the 2D viewing mode is activated, the intensity values (namely, a complete set of full 3-component RGB values) per multiscopic cell is included in the input signal, as different users see different sets of photo-emitted cells.

Optionally, the at least one processor is configured to obtain information indicative of a relative orientation of a longitudinal axis of the multiscopic optical element with respect to a longitudinal axis of the display,
wherein the at least one first photo-emitting cell and the at least one second photo-emitting cell are selected based further on the relative orientation of the longitudinal axis of the multiscopic optical element with respect to the longitudinal axis of the display.

It will be appreciated that, information pertaining to the relative orientation of the longitudinal axis of the multiscopic optical element with respect to the longitudinal axis of the display may be determined by the at least one processor, by processing sensor data collected by sensors (for example, such as gyroscopes, accelerometers, tilt sensors, and the like) that detect angular shifts or deviations between the two longitudinal axes. Alternatively, optionally, the at least one processor could use calibration data obtained during manufacturing or setup procedures. This information allows the at least one processor to determine whether the multiscopic optical element is tilted, rotated, or shifted with respect to the longitudinal axis of the display, thereby enabling the at least one processor to dynamically adjust subsequent operations to compensate for such deviations.

It will be appreciated that for minimizing visual artifacts (for example, such as aliasing effects or colour fringing), the longitudinal axis of the multiscopic optical element is slightly tilted with respect to the longitudinal axis of the display, i.e., the longitudinal axis of the multiscopic optical element and the longitudinal axis of the display do not coincide. In other words, said tilting is performed along an optical axis of the display (namely, a Z axis or a surface normal of the display). The longitudinal axis of the multiscopic optical element and the longitudinal axis of display are along a Y direction (i.e., a vertical direction) in a 3D plane. This has been illustrated in conjunction with FIG. 4, for better understanding.

It will also be appreciated that the multiscopic optical element sits flush against the display, but is rotated a few degrees in a manner that a Y-axis (namely, the longitudinal axis) of the multiscopic optical element is do not coincide with a Y-axis (namely, the longitudinal axis) of the display. This way, effectively, each successive scanline of photo-sensitive cells corresponds to a slightly offset position in relation to the multiscopic optical element, such that one or more photo-sensitive cells that are visible from a perspective of a given viewing direction, are not always same. As a result, when light from multiple differently coloured photo-sensitive cells from successive scanlines are shown together, the intended colour can be reproduced.

Once the relative orientation is known, the at least one processor evaluates how this misalignment affects light projection paths through the multiscopic optical element. The at least one processor then selects the at least one first photo-emitting cell and the at least one second photo-emitting cell by taking into account the relative orientation. By dynamically selecting which photo-emitting cells are activated for which user, the at least one processor ensures that the emitted light is properly directed through the multiscopic optical element, aligning with the eyes of the individual one of the at least one user, thereby preventing aliasing effects whilst maintaining image clarity. In an example, in case of a lenticular array, the lenticular array may be tilted relative to the display to achieve minimize artifacts caused by sharp edges or grid misalignment. A technical effect of the aforementioned feature is that the at least one processor dynamically compensates for an angular misalignment between the longitudinal axis of the multiscopic optical element and the longitudinal axis of the display, ensuring an accurate light projection and an alignment with the eyes of the individual one of the at least one user. This enhances image clarity and reduces visual artifacts as explained hereinabove.

Optionally, the at least one processor is configured to:
obtain information indicative of a given viewing direction from which a given eye of the individual one of the at least one user is viewing the photo-emitting cells lying on the given horizontal scanline and on whose optical path the given multiscopic cell lies; and
determine a given angle formed between the given viewing direction and an optical axis of the given multiscopic cell, wherein the at least one first photo-emitting cell and the at least one second photo-emitting cell are selected based further on the given angle.

Since the information indicative of the relative location of the first eye and of the second eye with respect to the multiscopic optical element is known to the at least one processor, and a location of the photo-emitting cells lying on the given horizontal scanline is also known to the at least one processor, it can easily determine a vector pointing from the given eye towards the photo-emitting cells. Such a vector is indicative of the given viewing direction. Optionally, the tracker is configured to track viewing directions of the given eye of the individual one of the at least one user. When the given viewing direction and the optical axis of the given multiscopic cell are known, the given angle therebetween can be easily calculated. In a case where the given viewing direction is perpendicular to a surface of the given multiscopic cell, the given angle is 0 degree. In another case, as the given viewing direction deviates from the optical axis of the given multiscopic cell (i.e., when the given angle is non-zero), an oblique angle is formed by the light with respect to an image plane of the display, and the given angle is such that the light emanates obliquely relative to the optical axis of the given multiscopic cell.

Moreover, the given angle formed between the viewing direction and the optical axis of the given multiscopic cell is used to determine how light rays are refracted through the given multiscopic cell and which photo-emitting cells are visible to the user. The selection of the at least one first photo-emitting cell and the at least one second photo-emitting cell is influenced by the given angle because it determines a spatial alignment of light rays with respect to the given eye of the individual one of the at least one user. When the given angle is small (i.e., the given viewing direction is closer to the optical axis), the light rays pass through a central or near-central region of the given multiscopic cell, and photo-emitting cells directly beneath the given multiscopic cell are selected. In this case, it can be understood that the at least one processor selects fewer photo-emitting cells because the light rays would be less dispersed. However, as the given angle increases (i.e., the given viewing direction deviates further from the optical axis of the given multiscopic cell), the light rays would pass through peripheral region(s) of the given multiscopic cell, causing greater dispersion. To compensate for this, the at least one processor selects a higher number of photo-emitting cells to ensure that the light rays are properly blended and directed toward the given eye. This ensures that perceived images remain sharp and aligned, even at oblique viewing angles, and any defocus and lens aberration effects can be mitigated. The technical effect of this criterion is that the system dynamically adjusts the selection of photo-emitting cells based on the user's viewing angle, ensuring consistent image quality and alignment across a wide range of viewing directions.

The present disclosure also relates to the method as described above. Various embodiments and variants disclosed above, with respect to the aforementioned first aspect (namely, the system), apply mutatis mutandis to the method.

Optionally, prior to retrieving the intensity values, the method further comprises binning pixels of the first image along an individual one of vertical lines of pixels, and binning pixels of the second image along an individual one of vertical lines of pixels Optionally, in the method, for at least two consecutive horizontal scanlines, same information indicating intensity values per multiscopic cell is included only once in the input signal.

Optionally, the method further comprises adjusting a shape of the given multiscopic cell of the multiscopic optical element, based on the relative location of the first eye and of the second eye of the individual one of the at least one user with respect to the multiscopic optical element, and the location of the given multiscopic cell in the multiscopic optical element, wherein the at least one first photo-emitting cell and the at least one second photo-emitting cell are selected based further on the shape of the given multiscopic cell.

Optionally, the at least one user is a plurality of users, wherein the method further comprises activating a two-dimensional (2D) viewing mode in at least a part of the display, by using intensity values per multiscopic cell per horizontal scanline that are retrieved and used for a given user, for a remainder of the plurality of users also.

Optionally, the method further comprises obtaining information indicative of a relative orientation of a longitudinal axis of the multiscopic optical element with respect to a longitudinal axis of the display, wherein the at least one first photo-emitting cell and the at least one second photo-emitting cell are selected based further on the relative orientation of the longitudinal axis of the multiscopic optical element with respect to the longitudinal axis of the display.

Optionally, the method further comprises:
obtaining information indicative of a given viewing direction from which a given eye of the individual one of the at least one user is viewing the photo-emitting cells lying on the given horizontal scanline and on whose optical path the given multiscopic cell; and
determining a given angle formed between the given viewing direction and an optical axis of the given multiscopic cell,
wherein the at least one first photo-emitting cell and the at least one second photo-emitting cell are selected based further on the given angle.

DETAILED DESCRIPTION OF THE DRAWINGS

Referring to FIG. 1, illustrated is an exemplary implementation of a system 100 for multiscopy, in accordance with an embodiment of the present disclosure. With reference to FIG. 1, the system 100 comprises a display 102, a multiscopic optical element 104 arranged on an optical path of the display 102, a display driver 106 connected to the display 102, and at least one processor (depicted as a processor 108). Herein, the processor 108 is communicatively coupled to the display driver 106 and optionally, to the multiscopic optical element 104 (in a case when the multiscopic optical element 104 is actively controllable). The display 102 comprises a plurality of photo-emitting cells 110 (for example, a red photo-emitting cell depicted using a letter "R", a green photo-emitting cell depicted using a letter "G", and a blue photo-emitting cell depicted using a letter "B"). For sake of simplicity, only some of the photo-emitting cells have been marked in FIG. 1. The multiscopic optical element 104 comprises a plurality of multiscopic cells (for example, depicted as three multiscopic cells 112a, 112b, and 112c, for sake of simplicity and clarity). The processor 108 is configured to perform various operations, as described earlier with respect to the aforementioned first aspect. The processor 108 is configured to obtain information indicative of a relative location of a first eye 114a and of a second eye 114b of an individual one of at least one user with respect to the multiscopic optical element 104. For sake of clarity, there are also shown three horizontal scanlines 116a, 116b, and 116c, wherein each of the horizontal scanlines 116a-c has 12 photo-emitting cells on whose optical path respective one of the multiscopic cells 112a-c lies. As an example, light 118a is shown to be emitted by a blue photo-emitting cell towards the first eye 114a upon passing through the multiscopic cell 112b. Similarly, light 118b is shown to be emitted by another blue photo-emitting cell towards the second eye 114b upon passing through the multiscopic cell 112b.

It may be understood by a person skilled in the art that FIG. 1 includes a simplified implementation of the system 100, for sake of clarity, which should not unduly limit the scope of the claims herein. The person skilled in the art will recognize many variations, alternatives, and modifications of embodiments of the present disclosure. For example, there could alternatively be cyan colour photo-emitting cells, magenta colour photo-emitting cells, and yellow colour photo-emitting cells.

Figure 2:
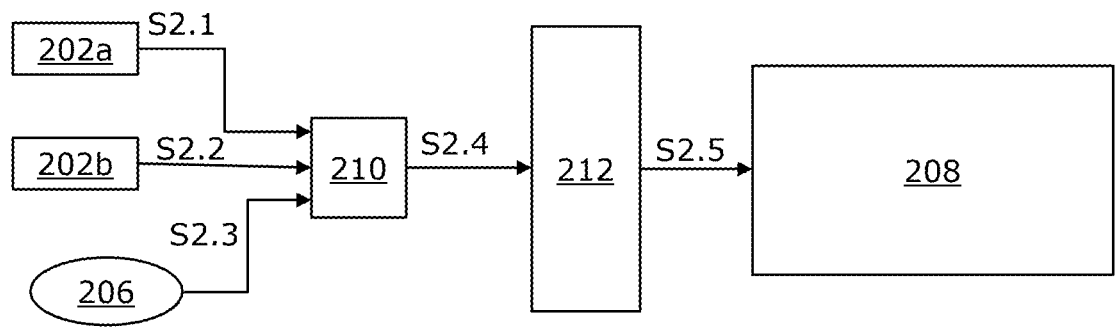
FIG. 2 illustrates an exemplary process flow in a system for multiscopy, in accordance with an embodiment of the present disclosure.

Referring to FIG. 2, illustrated is an exemplary process flow in a system for multiscopy, in accordance with an embodiment of the present disclosure. Herein, at steps S2.1 and S2.2, a multiplexing module 210 of the system receives a first image 202a and a second image 202b for a first eye and a second eye of an individual one of at least one user, respectively. The first image 202a and the second image 202a correspond to slightly distinct visual perspectives captured for stereoscopic viewing. At step S2.3, the multiplexing module 210 also receives information 206 indicative of relative locations of the first eye and the second eye with respect to a multiscopic optical element. Upon receiving the first image 202a, the second image 202b, and the information 206, the multiplexing module 210 is configured to process the first image 202a, the second image 202b and the information 206, to generate an input signal. In this regard, the multiplexing module 210 combines visual and positional data, arranging them in a structured format, such as side-by-side or other encoding schemes, suitable for downstream transmission. Upon generation of the input signal, at step S2.4, the input signal is sent to a display driver 212 via a display port or mobile industry processor interface (MIPI) transport protocol in a bandwidth-efficient manner. The display driver 212 is configured to generate drive signals based on the input signal. At step S2.5, the display driver 212 sends the drive signals to the display 208, for driving the display 208 to present the first image 202a and the second image 202b to the first eye and the second eye, respectively. The drive signals may be used to control an activation of thousands of wires or photo-emitting cells in the display 208, ensuring that stereoscopic images are properly aligned and rendered.

FIG. 2 is merely an example, which should not unduly limit the scope of the claims herein. A person skilled in the art will recognize many variations, alternatives, and modifications of embodiments of the present disclosure.

Figures 3A, 3B, 3C:
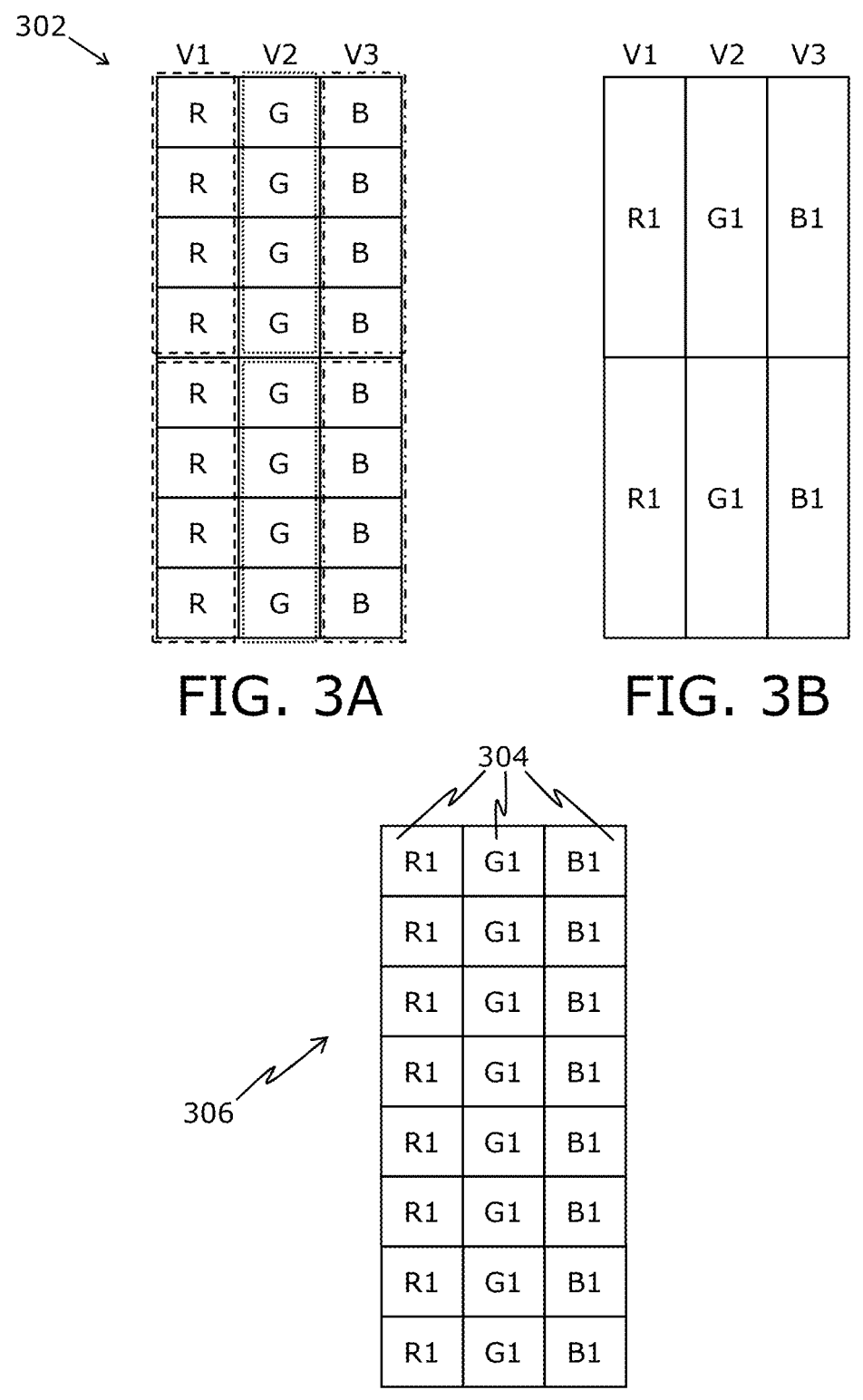

Referring to FIGS. 3A and 3B, FIG. 3A and FIG. 3B illustrate two exemplary vertical lines V1, V2, and V3 of pixels in a given image 302 prior to binning and upon binning, respectively, while FIG. 3C illustrates colours of corresponding photo-emitting cells 304 in a display 306 based on said binning, in accordance with an embodiment of the present disclosure. It is to be noted that FIGS. 3A-3C depict a specific implementation where the binning is performed at a sub-pixel level. For sake of simplicity and clarity only, a part of the given image 302 that has three vertical lines V1-V3 of sub-pixels is shown. With reference to FIG. 3A, a red colour sub-pixel is depicted using a letter "R", a green colour sub-pixel is depicted using a letter "G", and a blue colour sub-pixel is depicted using a letter "B". With reference to FIGS. 3A and 3B, a set (depicted using dashed line boxes) of four red colour sub-pixels of the given image 302 is binned along the vertical line V1 to form a binned red colour sub-pixel R1 (as shown in FIG. 3B). Another set (depicted using dashed line boxes) of four red colour sub-pixels of the given image 302 is binned along the vertical line V1 to form another binned red colour sub-pixel R2 (as shown in FIG. 3B). A set (depicted using dotted line boxes) of four green colour sub-pixels of the given image 302 is binned along the vertical line V2 of sub-pixels to form a binned green colour sub-pixel G1 (as shown in FIG. 3B). Another set (depicted using dashed line boxes) of four green colour sub-pixels of the given image 302 is binned along the vertical line V2 to form another binned green colour sub-pixel G2 (as shown in FIG. 3B). A set (depicted using dotted line boxes) of four blue colour sub-pixels of the given image 302 is binned along the vertical line V3 of sub-pixels to form a binned blue colour sub-pixel B1 (as shown in FIG. 3B). Another set (depicted using dashed line boxes) of four blue colour sub-pixels of the given image 302 is binned along the vertical line V3 to form another binned blue colour sub-pixel B2 (as shown in FIG. 3B). With reference to FIG. 3C, there is depicted that due to binning, output intensity values of sub-pixels belonging to a same set would be the same. Thus, respective output intensity values of four photo-emitting cells corresponding to the binned red colour sub-pixel R1 are depicted using a letter "R1", while respective output intensity values of four photo-emitting cells corresponding to the another binned red colour sub-pixel R2 are depicted using a letter "R2". Likewise, respective output intensity values of four photo-emitting cells corresponding to the binned green colour sub-pixel G1 are depicted using a letter "G1", while respective output intensity values of four photo-emitting cells corresponding to the another binned green colour sub-pixel G2 are depicted using a letter "G2". Similarly, respective output intensity values of four photo-emitting cells corresponding to the binned blue colour sub-pixel B1 are depicted using a letter "B1", while respective output intensity values of four photo-emitting cells corresponding to the another binned blue colour sub-pixel B2 are depicted using a letter "B2". The term "given image" encompasses a first image corresponding to a first eye of a given user and/or a second image corresponding to a second eye of the given user.

FIGS. 3A, 3B, and 3C, are merely examples, which should not unduly limit the scope of the claims herein. A person skilled in the art will recognize many variations, alternatives, and modifications of embodiments of the present disclosure.

Figure 4:
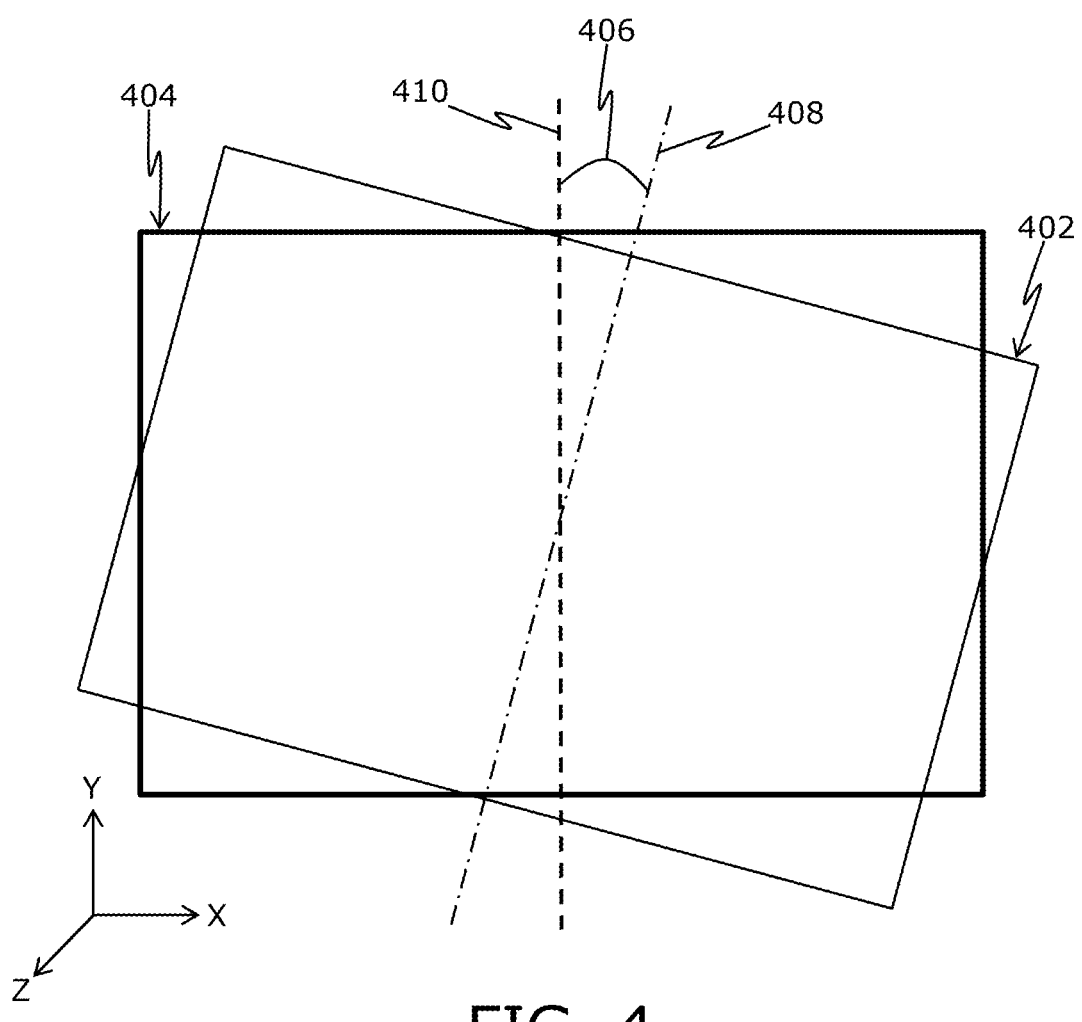
FIG. 4 illustrates an exemplary arrangement of a multiscopic optical element with respect to a display, in accordance with an embodiment of the present disclosure.

Referring to FIG. 4, illustrated is an exemplary arrangement of a multiscopic optical element 402 with respect to a display 404, in accordance with an embodiment of the present disclosure. Herein, the multiscopic optical element 402 is shown to be arranged on an optical path of the display 404 (namely, on a top surface of the display 404) in a manner that the multiscopic optical element 402 is arranged slightly titled with respect to the display 404 about an optical axis of the display 404 (namely, a Z axis). In this regard, there is shown a relative orientation 406 of a longitudinal axis 408 (depicted using a dotted line) of the multiscopic optical element 402 with respect to a longitudinal axis 410 (depicted using a dashed line) of the display 404.

FIG. 4 is merely an example, which should not unduly limit the scope of the claims herein. A person skilled in the art will recognize many variations, alternatives, and modifications of embodiments of the present disclosure.

Figure 5:
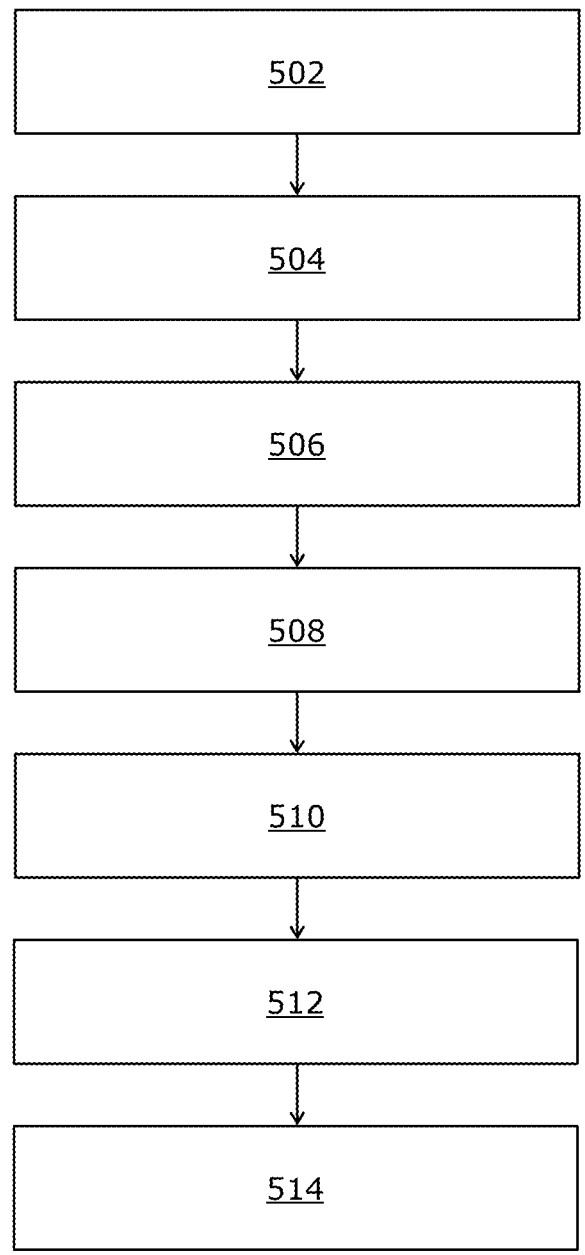
FIG. 5 illustrates steps of a method for multiscopy, in accordance with an embodiment of the present disclosure.

Referring to FIG. 5, illustrated are steps of a method for multiscopy, in accordance with an embodiment of the present disclosure. At step 502, information indicative of a relative location of a first eye and of a second eye of an individual one of at least one user is obtained with respect to a multiscopic optical element, wherein the multiscopic optical element is arranged on the optical path of a display, the multiscopic optical element comprising a plurality of multiscopic cells, and the display comprising a plurality of photo-emitting cells. At step 504, a first image and a second image is generated or retrieved, based on the relative location of the first eye and of the second eye of the individual one of the at least one user with respect to the multiscopic optical element, respectively. For a given multiscopic cell and a given horizontal scanline, at step 506, at least one first photo-emitting cell and at least one second photo-emitting cell are selected from amongst photo-emitting cells lying on the given horizontal scanline and on whose optical path the given multiscopic cell lies, based on the relative location of the first eye and of the second eye of the individual one of the at least one user with respect to the multiscopic optical element, respectively, and a location of the given multiscopic cell in the multiscopic optical element, the at least one first photo-emitting cell being photo-emitting cell(s) whose emitted light passes through the given multiscopic cell towards the first eye of the individual one of the at least one user is selected, and the at least one second photo-emitting cell being photo-emitting cell(s) whose emitted light passes through the given multiscopic cell towards the second eye of the individual one of the at least one user. For the given multiscopic cell and the given horizontal scanline, at step 508, intensity values for the at least one first photo-emitting cell and intensity values for the at least one second photo-emitting cell are retrieved from the first image and the second image, respectively. For the given multiscopic cell and the given horizontal scanline, at step 510, information indicating the intensity values for the at least one first photo-emitting cell, information indicating the intensity values for the at least one second photo-emitting cell, and metainformation indicating a location of the at least one first photo-emitting cell and of the at least one second photo-emitting cell in the given horizontal scanline on the display, are included in an input signal being sent to a display driver, wherein the display driver is connected to the display. At step 512, drive signals are generated based on the input signal. At step 514, the display is driven using the drive signals to present the first image and the second image to the first eye and the second eye of the individual one of the at least one user, respectively.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:
a display comprising a plurality of photo-emitting cells;
a multiscopic optical element arranged on an optical path of the display, the multiscopic optical element comprising a plurality of multiscopic cells;
a display driver connected to the display; and
at least one processor configured to:
obtain information indicative of a relative location of a first eye and of a second eye of of at least one user with respect to the multiscopic optical element;
generate or retrieve a first image and a second image, based on the relative location of the first eye and of the second eye with respect to the multiscopic optical element, respectively;
for a given multiscopic cell and a given horizontal scanline, select, from amongst photo-emitting cells lying on the given horizontal scanline and on whose optical path the given multiscopic cell lies, at least one first photo-emitting cell whose emitted light passes through the given multiscopic cell towards the first eye, and at least one second photo-emitting cell whose emitted light passes through the given multiscopic cell towards the second eye, based on the relative location of the first eye and of the second eye with respect to the multiscopic optical element, respectively, and a location of the given multiscopic cell in the multiscopic optical element;
for the given multiscopic cell and the given horizontal scanline, retrieve intensity values for the at least one first photo-emitting cell and intensity values for the at least one second photo-emitting cell, from the first image and the second image, respectively; and
for the given multiscopic cell and the given horizontal scanline, include in an input signal being sent to the display driver: information indicating the intensity values for the at least one first photo-emitting cell, information indicating the intensity values for the at least one second photo-emitting cell, and meta-information indicating a location of the at least one first photo-emitting cell and of the at least one second photo-emitting cell in the given horizontal scanline on the display;
wherein the display driver is configured to:
generate drive signals based on the input signal; and
drive the display using the drive signals to present the first image and the second image to the first eye and the second eye, respectively.

2. The system of claim 1, wherein prior to retrieving the intensity values, the at least one processor is configured to bin pixels of the first image along an individual one of vertical lines of pixels, and bin pixels of the second image along an individual one of vertical lines of pixels.

3. The system of claim 2, wherein for at least two consecutive horizontal scanlines, same information indicating intensity values per multiscopic cell is included only once in the input signal.

4. The system of claim 1, wherein the at least one processor is configured to adjust a shape of the given multiscopic cell of the multiscopic optical element, based on the relative location of the first eye and of the second eye of the at least one user with respect to the multiscopic optical element, and the location of the given multiscopic cell in the multiscopic optical element,
wherein the at least one first photo-emitting cell and the at least one second photo-emitting cell are selected based further on the shape of the given multiscopic cell.

5. The system of claim 1, wherein the at least one user is a plurality of users, wherein the at least one processor is configured to activate a two-dimensional (2D) viewing mode in at least a part of the display, by using intensity values per multiscopic cell per horizontal scanline that are retrieved and used for a given user, for a remainder of the plurality of users also.

6. The system of claim 1, wherein the at least one processor is configured to obtain information indicative of a relative orientation of a longitudinal axis of the multiscopic optical element with respect to a longitudinal axis of the display,
wherein the at least one first photo-emitting cell and the at least one second photo-emitting cell are selected based further on the relative orientation of the longitudinal axis of the multiscopic optical element with respect to the longitudinal axis of the display.

7. The system of claim 1, wherein the at least one processor is configured to:
obtain information indicative of a given viewing direction from which a given eye of the at least one user is viewing the photo-emitting cells lying on the given horizontal scanline and on whose optical path the given multiscopic cell lies; and
determine a given angle formed between the given viewing direction and an optical axis of the given multiscopic cell,
wherein the at least one first photo-emitting cell and the at least one second photo-emitting cell are selected based further on the given angle.

8. A method comprising:
obtaining information indicative of a relative location of a first eye and of a second eye of at least one user with respect to a multiscopic optical element, wherein the multiscopic optical element is arranged on the optical path of a display, the multiscopic optical element comprising a plurality of multiscopic cells, and the display comprising a plurality of photo-emitting cells;
generating or retrieving a first image and a second image, based on the relative location of the first eye and of the second eye of the at least one user with respect to the multiscopic optical element, respectively;
for a given multiscopic cell and a given horizontal scanline, selecting, from amongst photo-emitting cells lying on the given horizontal scanline and on whose optical path the given multiscopic cell lies, at least one first photo-emitting cell whose emitted light passes through the given multiscopic cell towards the first eye of the at least one user, and at least one second photo-emitting cell whose emitted light passes through the given multiscopic cell towards the second eye of the at least one user, based on the relative location of the first eye and of the second eye of the at least one user with respect to the multiscopic optical element, respectively, and a location of the given multiscopic cell in the multiscopic optical element;
for the given multiscopic cell and the given horizontal scanline, retrieving intensity values for the at least one first photo-emitting cell and intensity values for the at least one second photo-emitting cell, from the first image and the second image, respectively;
for the given multiscopic cell and the given horizontal scanline, including in an input signal being sent to a display driver: information indicating the intensity values for the at least one first photo-emitting cell, information indicating the intensity values for the at least one second photo-emitting cell, and meta-information indicating a location of the at least one first photo-emitting cell and of the at least one second photo-emitting cell in the given horizontal scanline on the display, wherein the display driver is connected to the display;
generating drive signals based on the input signal; and
driving the display using the drive signals to present the first image and the second image to the first eye and the second eye of the at least one user, respectively.

9. The method of claim 8, wherein prior to retrieving the intensity values, the method further comprises binning pixels of the first image along an individual one of vertical lines of pixels, and binning pixels of the second image along an individual one of vertical lines of pixels.

10. The method of claim 9, wherein for at least two consecutive horizontal scanlines, same information indicating intensity values per multiscopic cell is included only once in the input signal.

11. The method of claim 8, further comprising adjusting a shape of the given multiscopic cell of the multiscopic optical element, based on the relative location of the first eye and of the second eye of the at least one user with respect to the multiscopic optical element, and the location of the given multiscopic cell in the multiscopic optical element,
wherein the at least one first photo-emitting cell and the at least one second photo-emitting cell are selected based further on the shape of the given multiscopic cell.

12. The method of claim 8, wherein the at least one user is a plurality of users, wherein the method further comprises activating a two-dimensional (2D) viewing mode in at least a part of the display, by using intensity values per multiscopic cell per horizontal scanline that are retrieved and used for a given user, for a remainder of the plurality of users also.

13. The method of claim 8, further comprising obtaining information indicative of a relative orientation of a longitudinal axis of the multiscopic optical element with respect to a longitudinal axis of the display,
wherein the at least one first photo-emitting cell and the at least one second photo-emitting cell are selected based further on the relative orientation of the longitudinal axis of the multiscopic optical element with respect to the longitudinal axis of the display.

14. The method of claim 8, wherein the method further comprises:
obtaining information indicative of a given viewing direction from which a given eye of the at least one user is viewing the photo-emitting cells lying on the given horizontal scanline and on whose optical path the given multiscopic cell lies; and
determining a given angle formed between the given viewing direction and an optical axis of the given multiscopic cell,
wherein the at least one first photo-emitting cell and the at least one second photo-emitting cell are selected based further on the given angle.

* * * * *